(12) United States Patent
Gaia et al.

(10) Patent No.: US 8,864,461 B2
(45) Date of Patent: Oct. 21, 2014

(54) TURBINE FOR THE EXPANSION OF GAS/VAPOUR

(75) Inventors: Mario Gaia, Brescia (IT); Roberto Bini, Brescia (IT)

(73) Assignee: Turboden S.r.l., Brescia (IT)

( * ) Notice: Subject to any disclaimer, the term of this patent is extended or adjusted under 35 U.S.C. 154(b) by 609 days.

(21) Appl. No.: 13/257,057

(22) PCT Filed: Mar. 16, 2010

(86) PCT No.: PCT/IT2010/000113
§ 371 (c)(1),
(2), (4) Date: Sep. 20, 2011

(87) PCT Pub. No.: WO2010/106570
PCT Pub. Date: Sep. 23, 2010

(65) Prior Publication Data
US 2012/0009060 A1 Jan. 12, 2012

(30) Foreign Application Priority Data
Mar. 18, 2009 (IT) .............................. BS2009A0050

(51) Int. Cl.
F04D 29/10 (2006.01)
F01D 5/00 (2006.01)
F02C 7/06 (2006.01)
F01D 25/16 (2006.01)

(52) U.S. Cl.
CPC ............ *F01D 5/005* (2013.01); *F05D 2230/64* (2013.01); *F05D 2230/80* (2013.01); *F05D 2230/70* (2013.01); *F02C 7/06* (2013.01); *F01D 25/16* (2013.01); *F05D 2230/60* (2013.01)
USPC ........................................................ 415/230

(58) Field of Classification Search
USPC ................ 415/230, 229, 231, 170.1; 416/174
See application file for complete search history.

(56) References Cited

U.S. PATENT DOCUMENTS

| 5,145,334 A | 9/1992 | Gutknecht |
| 6,135,712 A * | 10/2000 | Chevrollier et al. ....... 415/216.1 |
| 2003/0014961 A1 | 1/2003 | Lawlor et al. |
| 2005/0287018 A1* | 12/2005 | Mavrosakis .................. 417/407 |

FOREIGN PATENT DOCUMENTS

EP 1 566 530 A1 8/2005

* cited by examiner

*Primary Examiner* — Edward Look
*Assistant Examiner* — Adam W Brown
(74) *Attorney, Agent, or Firm* — McGlew and Tuttle, P.C.

(57) ABSTRACT

The invention concerns a turbine structure for the expansion of gas and vapour, comprising a body or casing with a peripheral work fluid transit volute from an entrance to an exit passage, at least a first stator and possible subsequent stators, a turbine shaft rotating around an axis and carrying at least a first rotor and possible subsequent rotors working together downstream of the first stator and subsequent rotors, respectively, an external tube member jutting out frontally from said body or casing and coaxial to the rotating turbine shaft, and where between the tube member (18) and the turbine shaft (15) is positioned a supporting unit (19) extractable en bloc from said external tube (18) except for the shaft.

15 Claims, 4 Drawing Sheets

US 8,864,461 B2

TURBINE FOR THE EXPANSION OF GAS/VAPOUR

FIELD OF THE INVENTION

These invention refers to the field of turbines for the expansion of gas and vapour section in particular with a high molecular mass, and chiefly concerns improvements to the general structure of a turbine with one or more stages.

STATE OF THE TECHNIQUE

The turbines for the expansion of gas and vapour of the type taken into consideration essentially comprise a fixed body or casing having an entrance passage and an exit passage of the work fluid, at least a first stator and possible subsequent stators respectively of a first and possible subsequent turbine stages, a turbine shaft rotating around an axis and carrying at least a first rotor and possible subsequent rotors respectively associated with the first stator and with subsequent stators, and a system for assembling and supporting said turbine shaft on the body or casing.

It is well known that, in order to reach a high efficiency, the play between the fixed part, that is the body or casing, and the rotating part, that is each rotor of the turbine, must be greatly reduced in relation to certain points where the blow-by of fluid can become an important loss factor: in particular in labyrinth seals and in the space included between the apex of the vanes and the fixed ring skimmed by the vanes themselves.

The maintaining of limited play is made possible by the fact that the access temperatures of the flu id are relatively modest (typically falling between 80-300° C.), so the variation of the dimensions due to dilations is limited, in particular the diameters of the rotating devices that are involved, during the starting transient and during the normal operation of the machine at different loads.

Analogously, the maintaining of limited play is made possible by the fact that also the mechanical stress in the rotating parts is modest; consequently there is a limited variation in their dimensions, in particular the diameters, during the starting transient and the normal functioning of the machine.

As regards to the above, the use of rolling bearings is often preferable for the sustentation of the shaft of the turbine: in fact the rolling bearings can be made without intrinsic play so that the radial position of the shaft coincides when the machine is stopped and in rotation. Furthermore, the rolling bearings are less expensive than the plain bearings, and are tolerant should there be a brief lack of lubrication, that would on the other hand rapidly damage the plain bearings. In addition the rolling bearings are not damaged by the presence of frequently repeated stops and starts, on the contrary to the plain bearings.

However, both with rolling bearings and with plain bearings, it is important for the change of bearings to be trouble-free and rapid, in the same way as the change of the turning seal (should they be, as is known, flat face mechanical seals, gas seals, labyrinth or some other type) that block the passage of the work fluid from the internal volume of the turbine into the atmosphere and vice versa, should the internal pressure of the work fluid be less than the atmospheric pressure, preventing the entrance of air in the internal volume of the expander.

OBJECTIVES AND SUMMARY OF THE INVENTION

This invention has been developed based on the considerations and specific needs mentioned above and referring to a turbine for the expansion of a fluid in a gas or vapour state, chosen in particular between work fluids with a high molecular mass to be used in the field of systems for the production of energy from power sources and/or with moderate temperatures.

It is in fact one objective of this invention to propose a turbine structure for the expansion of gas and vapour including improvements both in the configuration of its body or casing, and in the combination and distribution of the components in said body, in order to simplify the assembly, to define and always maintain a secure seal of the fluid between the parts in rotation and those fixed.

Another objective of the invention is also to perfect the supporting system of the turbine shaft, to make dismantling easy and to facilitate maintenance operations.

The invention therefore proposes a turbine structure for gas and vapour expansion according to the preamble in claim 1, and in which the body or casing comprises a transit volute of work fluid from the entrance to the exit passage through rotors and stators, a shield that extends radially from said volute towards the axis of the turbine shaft and an external tube fixed in front of said shield and designed to carry the shaft of the turbine with the interposition of a support unit.

According to a further characteristic aspect the support unit of the shaft is axially extractable in block from the external tube, the shaft remaining where it is, and said support unit essentially comprising a concentric internal sleeve to the turbine shaft and carrying inside it some bearings and sealing means operating on the shaft.

Advantageously, the external tube and internal sleeve join concentrically through two peripheral reciprocal support zones with limited axial extension, provided between the internal surfaces of the tube member and outside of the sleeve, and also through a reciprocal conical support zone between said two components near their ends facing towards the rotors of the turbine. All together, the two radial supports and the conical one are basically the same as an isostatic system having a hinge on the side of the conical support zone in combination with a first contiguous radial support, and a carriage on the distant radial support on the side of the other radial support zone.

The invention consequently proposes technical solutions that correspond efficiently to the requirements indicated beforehand, that is to reach an excellent concentricity of the fixed and rotating parts, avoiding the onset of loads on the bearings due to the deforming of the mechanical structures, and to allow a secure confinement of the work fluid at least in the operating phases and also an easy exchange of the bearings and rotating seals.

BRIEF DESCRIPTION OF THE DRAWINGS

The invention will furthermore be described in detail with reference to the enclosed schematic drawings, in which.

DETAILED DESCRIPTION OF THE INVENTION

Figure 1:
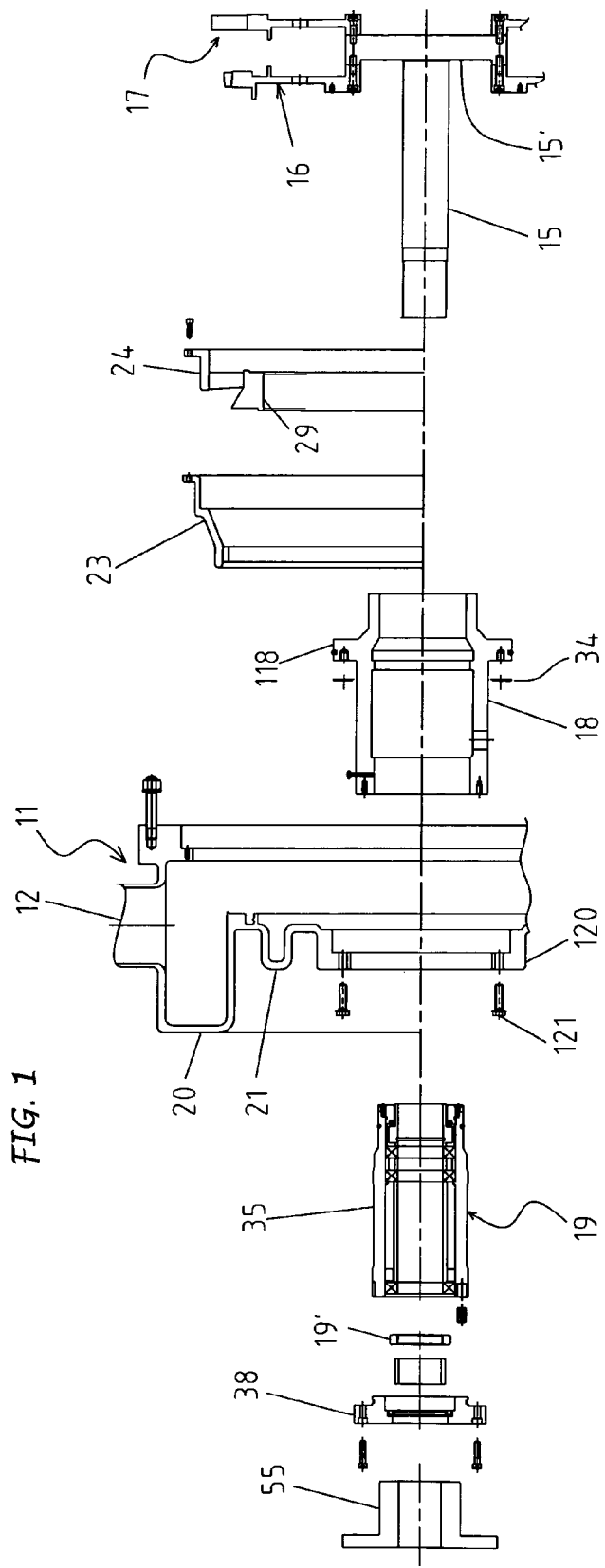
FIG. 1 shows an exploded view and a cross section of the components of a part of the dual stage turbine.
Figure 2:
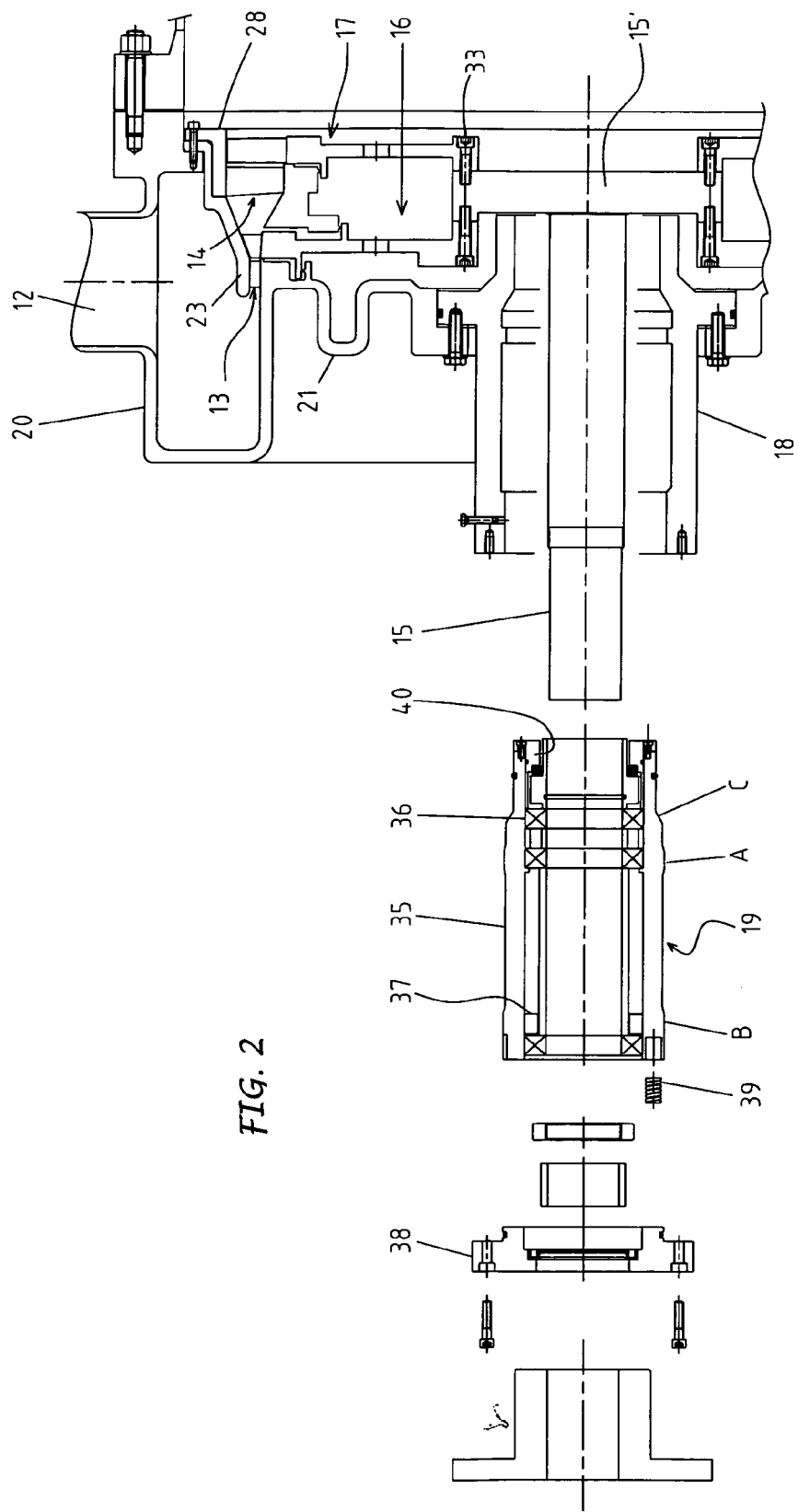
FIG. 2 shows, also in cross section, some of the components in FIG. 1 assembled, and others still separated.

The description that follows refers to an axial turbine, that is to say a turbine in which the transport of mass from the input to the output of the fluid mechanics path in which the expansion takes place is predominantly due to the axial components of the speed of the fluid, but the invention is also applicable to turbines with diagonal flow or also only locally radial.

In the example represented the turbine, although only partially shown, is however the axial type and comprises two stages. It basically has: a body or casing 11 with an entrance path of the fluid 12 and an exit path—not shown—; a first stator 13 and a second stator 14; a turbine shaft 15 rotating around an axis X and carrying a first rotor 16 and a second rotor 17 positioned downstream of the first stator 13 and of the second stator 14, respectively; and a system for the assembly of said shaft on the body or casing 11, made up of a tube member 18 and by a support unit 19 inside the tube member.

Starting from the most external part, the body or casing of the turbine 11 has a volute 20 and a frontal ring-like shield 21. The volute 20 defines a duct through which the fluid that arrives from the entrance passage 12 is carried to the stator 13 of the first stage and on to the stator in the second stage and to every possible stage following on. The ring-like shield 21 extends radially from the volute 20 towards the axis X of the shaft 15. The volute 20 and the shield 21 can be an integral part, as shown in the drawings, or made up of two respective parts fixed between them either by welding or by means of a flanged connection.

Then, preferably, the shield 21 is not flat but, seen in a meridian cross-section, has a corrugated shape, defined by a succession of cylindrical or also conical parts joined by radial sections, defining loops and protrusions. This configuration is such as to allow deformations of the shield 21 turned to absorb the radial expansion and to limit the stresses caused by the differences in temperature between the inside and outside of the turbine so that they do not influence the coaxiality of the system.

The stator 13 of the first stage of turbine is made up of a respective first plurality of statoric vanes 22 attached towards the outside to a first statoric ring 23. This ring is fixed overhanging inside the volute, or to a flange connected to it, so that the ends of said blades 22 rest against the internal surface 24 of a part of the volute 20 just upstream of the rotor 16 of the first stage, directly, or by means of an interposed calibrated ring—not shown— which could be returned to the internal surface of the volute and which would in this case be easier to work.

The first rotor 16 is made up of a relative disc 25 fixed to the turbine shaft 15 and provided with radial blades 26 facing towards and skimming said statoric ring 23 with reduced play and/or with the possible interposition of a peripheral ring, continuous or segmented, attached to the same blades.

In the same way the stator 14 of the second stage of turbine is made up of a relative second plurality of statoric blades 27 supported externally by a second statoric ring 28 that is fixed in the same way as the first statoric ring 23, or together with it, inside the volute 20, so that the ends of said second blades 27 rest against an interstage diaphragm 29 just upstream of the second rotor 17. Also this second rotor is made up of a relative disc 30 fixed to the turbine shaft 15 in the same way as the disc 25 of the first rotor 16 and is provided with radial blades 31 facing towards and skimming said second statoric ring 28.

Figure 3:
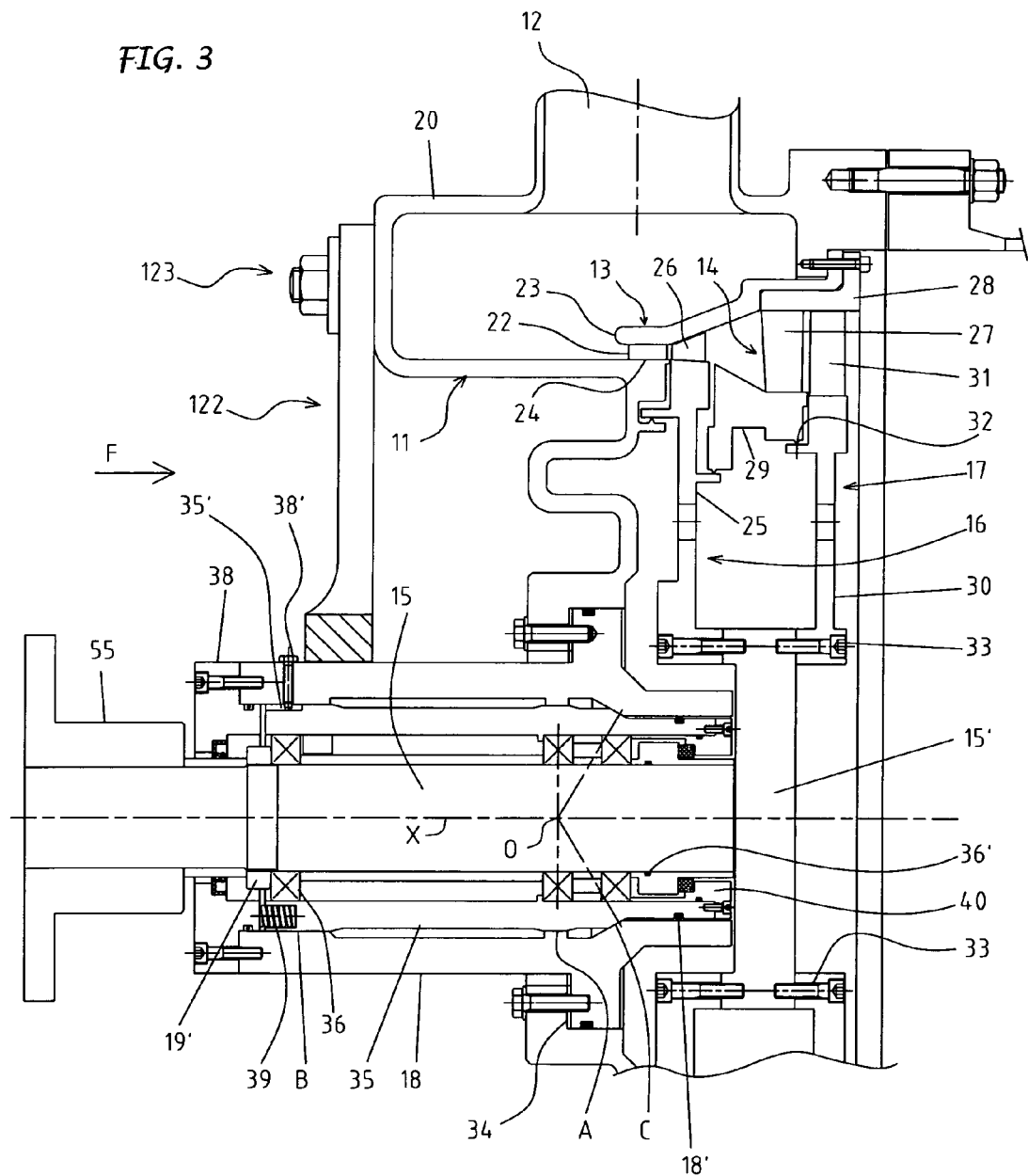
FIG. 3 shows, once more a cross section of a part of the assembled turbine.

The interstage diaphragm 29 is static, positioned between the discs 25, 30 of the two rotors 16, 17 with the interposition of labyrinth sealing means 32, which in the drawing—FIG. 3—are schematically represented as spire shaped annular elements.

As a whole, the support of the statoric blades, in particular those of the first statoric ring which are less extended radially, to the internal surface of the volute directly or indirectly, ensures the concentricity between the rotation axis of the rotors 16, 17, obviously coincident with the axis X of the turbine shaft 15, and the external statoric rings 23, 28 when the turbine is in function, a condition that would not exist if said coaxiality were entrusted only to the internal side of the volute, larger and connected to the tube member with a longer run and subject then to greater thermal expansion and variations in diameter.

The turbine shaft 15 has a preset diameter, and at its end facing towards the inside of the body or casing 11 has at least one head 15' preferably made integrally together with the shaft—FIG. 1—. As shown, the discs 25, 30 of the rotors 16, 17 are fixed on opposite parts of the head 15' of the shaft 15, for example both by means of a teethed system and/with screw stays or the like 33.

The tube member 18 of the assembly system of the turbine shaft 15 is connected coaxially to the shield 21 and protrudes from the front of the casing 11 according to the axis X of said shaft. The connection can be carried out by welding or by flanging. In this second case, the tube member 18 has a peripheral flange 118 that is fixed, by means of screws 121, to a counter flange 120 provided along the internal margin of the shield 21, and between the flange and counter flange are inserted some spacers 34. These spacers are preferably made up of washers that can have different widths and be superimposed in different numbers so as to establish a correct connection and radial play between the ends of the rotoric blades and the corresponding statoric ring of the first stage, at least the contiguity between said rotoric blades and the respective external ring becomes defined by a conical surface—that is to say not cylindrical—as in the case represented.

Figure 4:
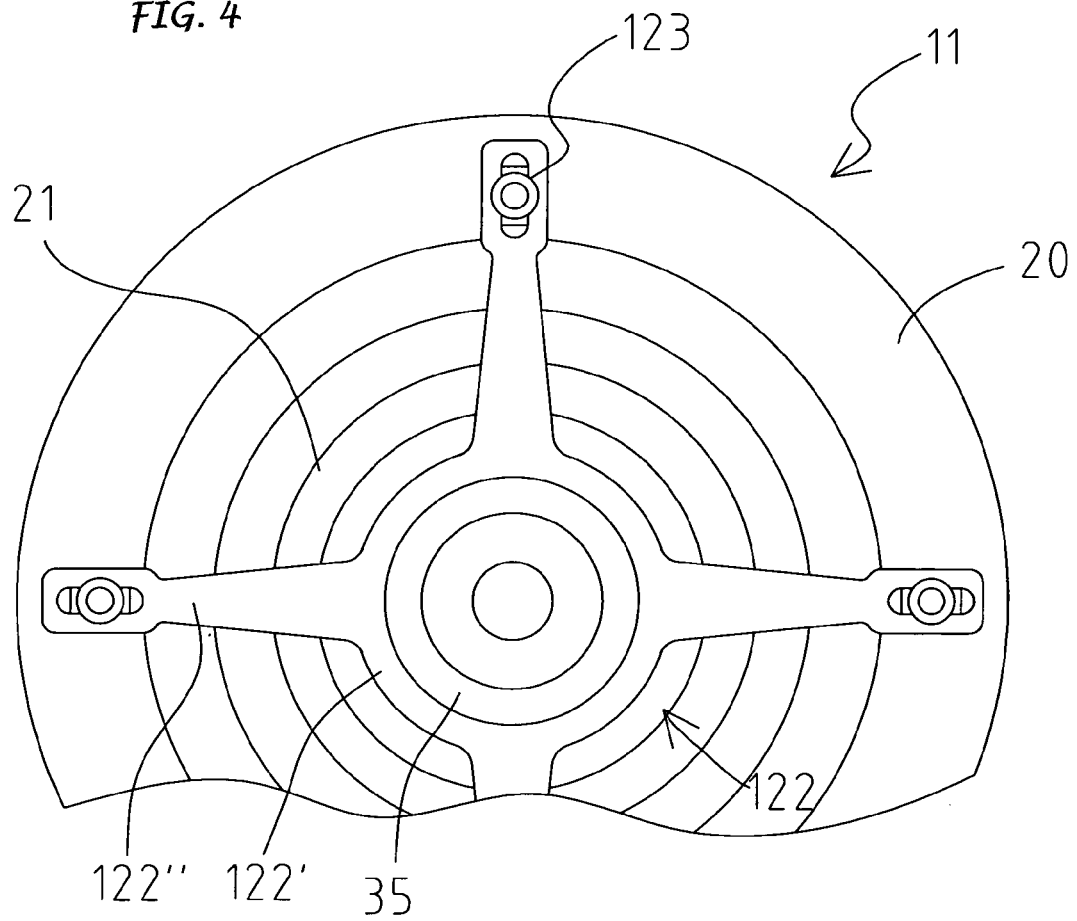
FIG. 4 shows a front view according to the arrow F of the whole in FIG. 3.

In addition, the tube member 18 and the turbine casing 11 or, better, the front of the volute 20, can also be connected by a support 118 for example of the spider or dial type as shown in FIG. 4, designed to prevent axial deviations, vibrations or oscillations of the tube member so as to ensure the coaxiality of the latter relatively to the body or casing 11. The support 122 can have an annular part 122' encircling the tube member 18 and some radial arms 122" that connect to the volute using appropriate means 123 so as to allow a certain degree of radial freedom.

The support unit 19 of the turbine shaft 15 comprises components that are assembled when they are installed in the tube member around the shaft and which are then axially extractable all together from the tube member 18 except for the shaft 15.

In particular, the support unit 19 comprises a sleeve 35 that has an external diameter compatible with the internal diameter of the to be member 18 and which holds inside, with the help of spacers, bearings 36, preferably roller, and a sealing system 40 operating on the shaft.

It is important that the radial connecting of the support unit with the tube member 18 takes place so that it does not cause deformations of the inside of the sleeve 35 and neither variations in its coaxiality compared with the turbine shaft. This purpose is reached advantageously by an isostatic type of coupling between the external tube member 18 and internal sleeve 35. According to the invention this isostatic type of coupling is carried out by creating two circumferential support zones A, B, however with limited surface extensions and separated in parallel, between the internal surface of the tube member 18 and the external surface of the sleeve 35, and a conical, that is spherical, support zone C always between the tube member 18 and sleeve 35 near their end facing towards the head 15' of the turbine shaft 15, that is to say towards the rotors 16, 17—FIG. 3.

These ways of radially and conically supporting is comparable from the cinematic point of view to a support on a line more than on a wide surface, which from the side of the conical or spherical support zone C, combined with the radial support zone A contiguous to it, is equivalent to a hinge with centre in O, whereas from the side of the extreme radial support zone B, it is equivalent to a carriage, so the system tends not to transmit to the inside sleeve 3, improper deformations in the meridian plane of the external tube member 18.

The support unit 19 is held axially in the tube member 18 by a ring nut 19' screwed to the shaft 15. At the free external end of the tube member 18 is fixed a head flange 38. At the free end of the shaft 15 is fixed, using any appropriate means, a head joint 55 to connect it to a device—not shown—to transmit a drive torque. On the other side, between the head flange 38 and the sleeve 35 of the support unit 19 can be arranged some selected pressure springs 39 operating in the direction to ensure physical contact of the two coaxial components—tube member/sleeve—in the conical support zone C, winning against both the load due to possible unbalance of the turbine and the one due to the thrust of the work fluid.

Between the tube member 18 and the support unit 19 of the turbine shaft 15 will also be provided, although not shown, an appropriate lubrication system.

The abovementioned sealing system 40 can be a mechanical type and positioned between the internal end of the sleeve 35 and the head 15' of the turbine shaft 15 so as also to be extractable together with other components of the support unit 19. Between the sleeve 35 of the support unit 18 and the tube member 18 at least a sealing gasket 18' can be positioned the same applying to another sealing gasket 36' that can be placed between the mechanical sealing device 40 and the turbine shaft 15. Frontally, at the internal end of the tube member 18 is assembled on the other hand a sealing gasket 41 facing towards the head 15' of the turbine shaft 15.

Furthermore, the housed tube member 18 and the sleeve 35 are radially connected to each other by a screw or key 38' so as to define the insertion position and to prevent rotation of the sleeve in the to be member. As shown in FIG. 3 the screw or key 18' operate in an extended seat 35' so as to allow small axial movements of the support unit 19 compared with the shaft 15 and the tube member 18.

Thanks to this placing, the support unit 19, thrust by the springs 39 can normally hold itself in an advanced contact position on a level with the conical support C, but also retract slightly depending on the axial position of the shaft head of the turbine so as to be able to adjust/regulate the position of the rotor group inside the body or casing of the turbine.

The invention claimed is:

1. A turbine structure for the expansion of gas and vapor, comprising:
    a body or casing with a peripheral work fluid transit volute from an entrance to an exit passage;
    at least a first stator;
    a turbine shaft rotating around an axis and carrying at least a first rotor working together downstream of the first stator;
    an external tube member jutting out frontally from said body or casing and coaxial to the rotating turbine shaft, wherein between the tube member and the turbine shaft a supporting unit is positioned axially and is extractable enbloc from said external tube, while the shaft remains still, wherein said supporting unit comprises an internal sleeve concentric to the turbine shaft and carrying inside said supporting unit some bearings and a seal operating on said shaft, and in which said supporting unit is held axially in said external tube, said supporting unit and said internal sleeve connecting concentrically through two peripheral reciprocal support zones, with limited axial extension, provided between the internal surfaces of the tube member and outside of the sleeve, and through a conical, or spherical, supporting zone between said tube and said sleeve near their ends facing towards the rotors of the turbine, said radial and conical, or spherical, supports forming an isostatic supporting system with constraints, from the conical or spherical support zone side in combination with a contiguous radial support equivalent to a hinge and, on the distant radial support side, equivalent to a carriage.

2. A turbine structure according to claim 1, wherein said supporting unit of the turbine shaft is stopped axially in said tube member by a head flange fixed to the tube itself, and wherein between said flange and said supporting unit operating flexible means is inserted to ensure a physical contact of the tube member and sleeve in the reciprocal conical or spherical supporting zone.

3. A turbine structure according to claim 1, wherein the turbine shaft has at least one head and each rotor is fixed to said head of said turbine shaft by means of a toothed sleeve and tie-rods.

4. A turbine structure according to claim 3, wherein the supporting unit of the turbine shaft has a hydraulic gripping system on said shaft.

5. A turbine structure according to claim 1, wherein between the tube member and the sleeve a screw or spline is provided radially acting as an anti-rotation means of said sleeve in the tube member, said screw or spline operating in an extended seat so as to allow limited axial movements of the supporting unit with regard to the shaft and tube member.

6. A turbine structure according to claim 1, further comprising a ring-like front shield that extends radially from the peripheral volute of the turbine body or casing and fixed centrally to the supporting tube member of the turbine shaft.

7. A turbine structure according to claim 6, wherein said ring-like front shield forms an integral part with the peripheral volute of the turbine body or casing and the tube member is fixed centrally in front of said ring-like shield.

8. A turbine structure according to claim 7, wherein the front ring-like shield is fixed externally to the peripheral volute of the turbine body or casing and the tube member is fixed centrally in front of said ring-like shield.

9. A turbine structure according to claim 8, wherein said front ring-like shield viewed radially has a corrugated configuration defined by a series of cylindrical or conical parts connected by radial sections.

10. A turbine structure according to claim 8, wherein between the tube member and the peripheral volute of the turbine body or casing an additional support is provided to stabilize position and coaxiality of said tube with regard to the turbine body or casing.

11. A turbine structure according to claim 7, wherein between the tube member and the peripheral volute of the turbine body or casing an additional support is provided to stabilize position and coaxiality of said tube with regard to the turbine body or casing.

12. A turbine structure according to claim 7, wherein said front ring-like shield viewed radially has a corrugated configuration defined by a series of cylindrical or conical parts connected by radial sections.

13. A turbine structure according to claim 6, wherein said front ring-like shield viewed radially has a corrugated configuration defined by a series of cylindrical or conical parts connected by radial sections.

14. A turbine structure according to claim 1, wherein the turbine first stage stator has blades which extend from an external statoric ring fixed projecting inside the peripheral volute and resting directly or through an inserted calibrated ring against an internal part of the volute itself, and wherein the rotor of said first stage has rotoric blades that skim a facing surface of said statoric ring directly or by inserted means, said rotoric blades extending from a first rotoric ring.

15. A turbine structure according to claim 13, wherein the stator of a turbine second stage has statoric blades that extend from a second external statoric ring and rest against an inter-stage diaphragm with labyrinth sealing means, wherein the rotor of said second stage has rotoric blades that directly or indirectly skim a facing surface of said second statoric ring and in which said second rotoric ring is fixed either to the first rotoric ring or to the inside of the peripheral volute.

* * * * *